J. GRIFFITH.
Sectional Steam-Boilers.

No. 157,718. 2 Sheets--Sheet 1. Patented Dec. 15, 1874.

J. GRIFFITH.
Sectional Steam-Boilers.

No. 157,718. Patented Dec. 15, 1874.

Witnesses:
Henry Gentner
Chas. Wahlers.

Inventor:
John Griffith
per
Van Santvoord & Hauff
Attys.

UNITED STATES PATENT OFFICE.

JOHN GRIFFITH, OF YONKERS, ASSIGNOR TO FREDERICK C. DURANT, OF NEW YORK, N. Y.

IMPROVEMENT IN SECTIONAL STEAM-BOILERS.

Specification forming part of Letters Patent No. 157,718, dated December 15, 1874; application filed June 3, 1874.

*To all whom it may concern:*

Be it known that I, JOHN GRIFFITH, of Yonkers, in the county of Westchester and State of New York, have invented a new and useful Improvement in Sectional Steam-Boilers; and I do hereby declare the following to be a full, clear, and exact description thereof, which will enable those skilled in the art to make and use the same, reference being had to the accompanying drawing, in which drawing—

Figure 1:
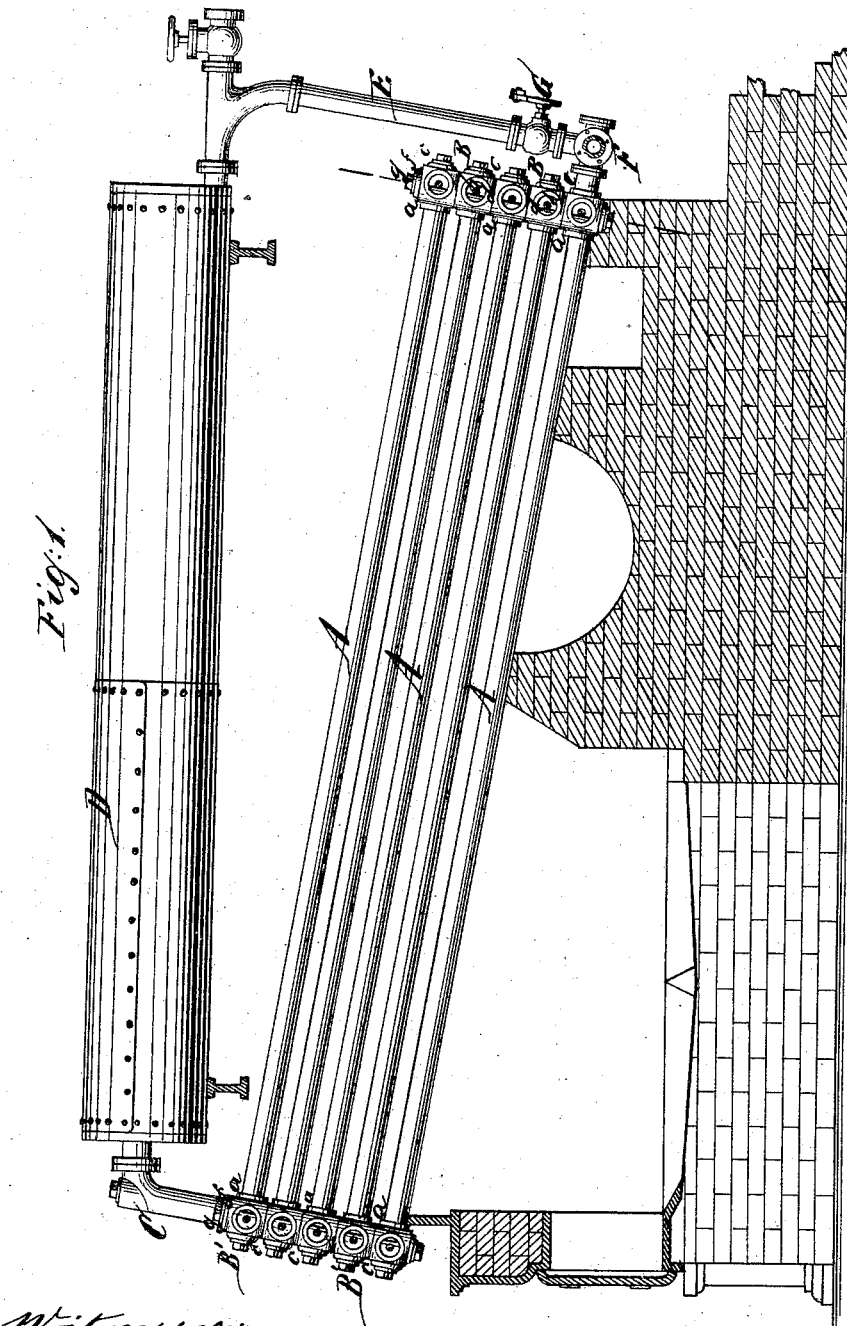
Figure 2:
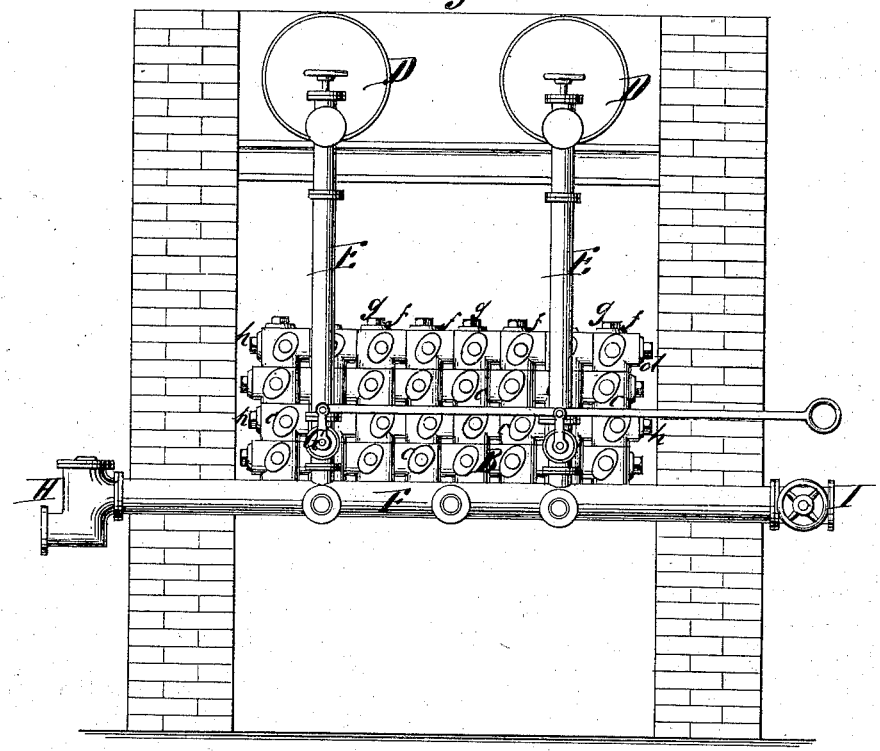
Figure 3:
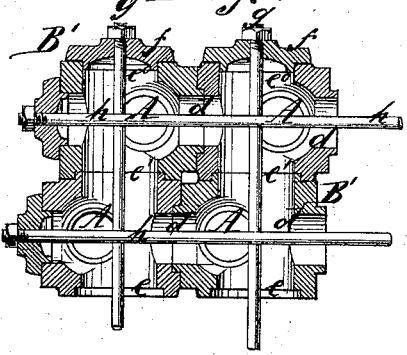

Figure 1 represents a longitudinal vertical section of my boiler. Fig. 2 is a rear view of the same. Fig. 3 is a transverse section in the plane $x\,x$, Fig. 1.

Similar letters indicate corresponding parts.

This invention relates to certain improvements in steam-boilers; and consists of a vertical pipe having a stop-cock, and extending from one end of a steam-drum down to a cross-pipe connecting with the feed-pipe, and communicating with the lower series of inclined water-tubes, which latter are connected together by heads in the usual manner. From the upper series of water-tubes a steam-pipe extends to the steam-drum, all in such a manner that by closing the stop-cock in the vertical pipe, and opening the blow-off cock, the steam from the steam-drum is caused to rush through the water-tubes, and they are thereby readily cleansed from all impurities.

In the drawing, the letters A A A designate the water-tubes, which are arranged in several series, one above the other, and placed in an inclined position, as shown in Fig. 1. The lowest ends of these tubes are secured in heads B, and their upper ends in heads B′, one head being used for the end of each tube. Each of these heads is provided with a screw-socket, $a$, to receive the end of its tube, and opposite to these screw-sockets are hand-holes $b$, which are closed by covers $c$, so that, by removing these covers, access can be had to the interior of each tube. The heads on each end are arranged in tiers, one above the other, so as to break joints, and the heads in each tier communicate with each other by openings $d$, while the heads constituting the lowest tier communicate with those constituting the second tier by openings $e$, those constituting the second tier with the heads of the third tier by openings $e'$, and so on, the opening $e^0$ in the upper sides of the topmost tier being firmly closed by washers $f$ placed under the nuts or heads of screw-rods $g$, which extend through the openings $e\ e'\ e^0$, and serve to secure the heads together. Similar screw-rods $h$ extend through the lateral openings $d$ in the heads. The openings $e\ e'$ in the heads B and B′ are each of larger area than the area of the cross-section of the tube secured in each of the heads, so that the steam which disengages from the water in the tube can rise up freely and without any obstruction, and by these means the generation of steam is materially facilitated.

As steam is generated in such a water-tube boiler with great speed, foam is produced, and the steam tends to pass from the tube out of the upper passage of the head intimately mixed with water. As, however, such passage of the head is of greater area than the area of the transverse section of the tube, the steam and water on issuing from the tube are permitted to expand and the water, still mixed with the steam, is also transformed into steam, and at the same time the free generation of steam in the tubes is increased.

From the upper tier of the heads B′ rises a pipe, C, which connects with a steam-drum, D, entering through the head of this drum above its center, while from the opposite head of said drum close down to its bottom edge extends an upright pipe, E, which communicates with the cross-pipe F. In the upright pipe E is a stop-valve, G, by means of which the communication between the steam-drum and the cross-pipe can be shut off, and said cross-pipe connects by short branch pipes with the lowest tier of the heads B. One end of this cross-pipe connects by a cock, H, with the feed-pipe, and in its other end is secured the blow-off cock I. The cross-pipe F serves to increase the circulation of the water in the boiler, and by means of the stop-valve G and blow-off cock I the operation of cleansing the water-tubes is rendered simple and easy. By closing the valve G and opening the blow-off cock the steam from the steam-drum is caused to rush through the water-tubes, and the impurities which have accumulated therein are blown out.

What I claim as new, and desire to secure by Letters Patent, is—

The combination of the vertical pipe E, having the stop-cock G, and extending from the steam-drum D to the cross-pipe F having the blow-off cock I with the series of inclined tubes A and heads B B, the lower series of said tubes communicating with the cross-pipe F, and the upper series communicating with a steam-pipe extending to the steam-drum, the whole being arranged substantially as and for the purpose described.

JOHN GRIFFITH.

Witnesses:
 W. HAUFF,
 JAMES L. NORRIS.